US012332595B2

(12) United States Patent
Sakamoto et al.

(10) Patent No.: US 12,332,595 B2
(45) Date of Patent: Jun. 17, 2025

(54) IMAGE FORMING APPARATUS AND IMAGE QUALITY ADJUSTMENT METHOD CAPABLE OF SUPPRESSING VARIATION IN IMAGE QUALITY OF OUTPUT IMAGE IMMEDIATELY AFTER START OF IMAGE FORMING PROCESS

(71) Applicant: KYOCERA Document Solutions Inc., Osaka (JP)

(72) Inventors: Yasuaki Sakamoto, Osaka (JP); Masaru Watanabe, Osaka (JP); Kenichi Hayashi, Osaka (JP); Ayato Morikami, Osaka (JP); Hideyuki Ogasawara, Osaka (JP); Yukiko Yoshimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/617,244

(22) Filed: Mar. 26, 2024

(65) Prior Publication Data

US 2024/0329584 A1 Oct. 3, 2024

(30) Foreign Application Priority Data

Mar. 27, 2023 (JP) ................................ 2023-049733

(51) Int. Cl.
*G03G 15/00* (2006.01)

(52) U.S. Cl.
CPC ..... *G03G 15/5041* (2013.01); *G03G 15/5045* (2013.01); *G03G 15/5062* (2013.01)

(58) Field of Classification Search
CPC .......... G03G 15/5041; G03G 15/5045; G03G 15/5054; G03G 15/5058; G03G 15/5062
See application file for complete search history.

(56) References Cited

U.S. PATENT DOCUMENTS 9,471,021 B2 * 10/2016 Tosaka ............... G03G 15/5058
11,815,839 B2 * 11/2023 Oba .................. G03G 15/5054
2009/0245828 A1 * 10/2009 Ito ..................... G03G 15/0131
399/49

FOREIGN PATENT DOCUMENTS

JP 2016177197 A 10/2016

* cited by examiner

*Primary Examiner* — Hoang X Ngo
(74) *Attorney, Agent, or Firm* — Alleman Hall & Tuttle LLP

(57) ABSTRACT

An image forming apparatus includes an adjustment processing portion, an acquisition processing portion, and a determination processing portion. Each time an adjustment condition is satisfied during execution of an image forming process, the adjustment processing portion uses toner to adjust one adjustment target selected in accordance with a specific order among a plurality of adjustment targets related to image quality of an output image output by the image forming process. The acquisition processing portion acquires variation amount information related to an amount of variation in a state value related to an image forming portion caused by a start of the image forming process. The determination processing portion determines an adjustment target to be adjusted first after the start of the image forming process by the adjustment processing portion, based on the variation amount information acquired by the acquisition processing portion.

6 Claims, 9 Drawing Sheets

IMAGE FORMING APPARATUS AND IMAGE QUALITY ADJUSTMENT METHOD CAPABLE OF SUPPRESSING VARIATION IN IMAGE QUALITY OF OUTPUT IMAGE IMMEDIATELY AFTER START OF IMAGE FORMING PROCESS

INCORPORATION BY REFERENCE

This application is based upon and claims the benefit of priority from the corresponding Japanese Patent Application No. 2023-049733 filed on Mar. 27, 2023, the entire contents of which are incorporated herein by reference.

BACKGROUND

The present disclosure relates to an electrophotographic image forming apparatus and an image quality adjustment method executed in the image forming apparatus.

An electrophotographic image forming apparatus includes an image forming portion that forms an image using toner. Further, the image forming apparatus is known that, during execution of an image forming process using the image forming portion, uses toner to adjust the image quality of an output image output by the image forming process. For example, in this type of image forming apparatus, the density of the output image is adjusted based on the result of detection of the density of a predetermined detection toner image formed using toner.

SUMMARY

An image forming apparatus according to an aspect of the present disclosure includes an image forming portion, an adjustment processing portion, an acquisition processing portion, and a determination processing portion. The image forming portion forms an image using toner. Each time a predetermined adjustment condition is satisfied during execution of an image forming process using the image forming portion, the adjustment processing portion uses the toner to adjust one adjustment target selected in accordance with a predetermined specific order among a plurality of adjustment targets related to image quality of an output image output by the image forming process. The acquisition processing portion acquires variation amount information related to an amount of variation in a predetermined state value related to the image forming portion caused by a start of the image forming process. The determination processing portion determines an adjustment target to be adjusted first after the start of the image forming process by the adjustment processing portion, based on the variation amount information acquired by the acquisition processing portion.

An image quality adjustment method according to another aspect of the present disclosure is executed by an image forming apparatus including an image forming portion configured to form an image using toner, and includes an adjustment step, an acquisition step, and a determination step. In the adjustment step, each time a predetermined adjustment condition is satisfied during execution of an image forming process using the image forming portion, the toner is used to adjust one adjustment target selected in accordance with a predetermined specific order among a plurality of adjustment targets related to image quality of an output image output by the image forming process. In the acquisition step, variation amount information related to an amount of variation in a predetermined state value related to the image forming portion caused by a start of the image forming process is acquired. In the determination step, an adjustment target to be adjusted first after the start of the image forming process by the adjustment step is determined based on the variation amount information acquired by the acquisition step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments of the present disclosure will be described below with reference to the drawings. It is noted that the following embodiments are examples of embodying the present disclosure and do not limit the technical scope of the present disclosure.

First Embodiment

First, a configuration of an image forming apparatus 100A according to a first embodiment of the present disclosure will be described with reference to FIG. 1 and FIG. 2.

It is noted that, for convenience of description, the vertical direction in an installed state (the state shown in FIG. 1) in which the image forming apparatus 100A can be used is defined as an up-down direction D1. In addition, a front-rear direction D2 is defined assuming that the surface of the image forming apparatus 100A shown in FIG. 1 on the left side on the paper surface is the front side (front surface). In addition, a left-right direction D3 is defined with reference to the front side of the image forming apparatus 100A in the installed state.

The image forming apparatus 100A is a multifunction peripheral having a plurality of functions such as a facsimile function and a copy function in addition to a scan function for reading an image of a document sheet and a print function for forming an image based on image data. It is noted that the present disclosure may also be applied to image forming apparatuses, such as a printer, a facsimile machine, and a copier, capable of forming an image using an electrophotographic method.

Figure 1:
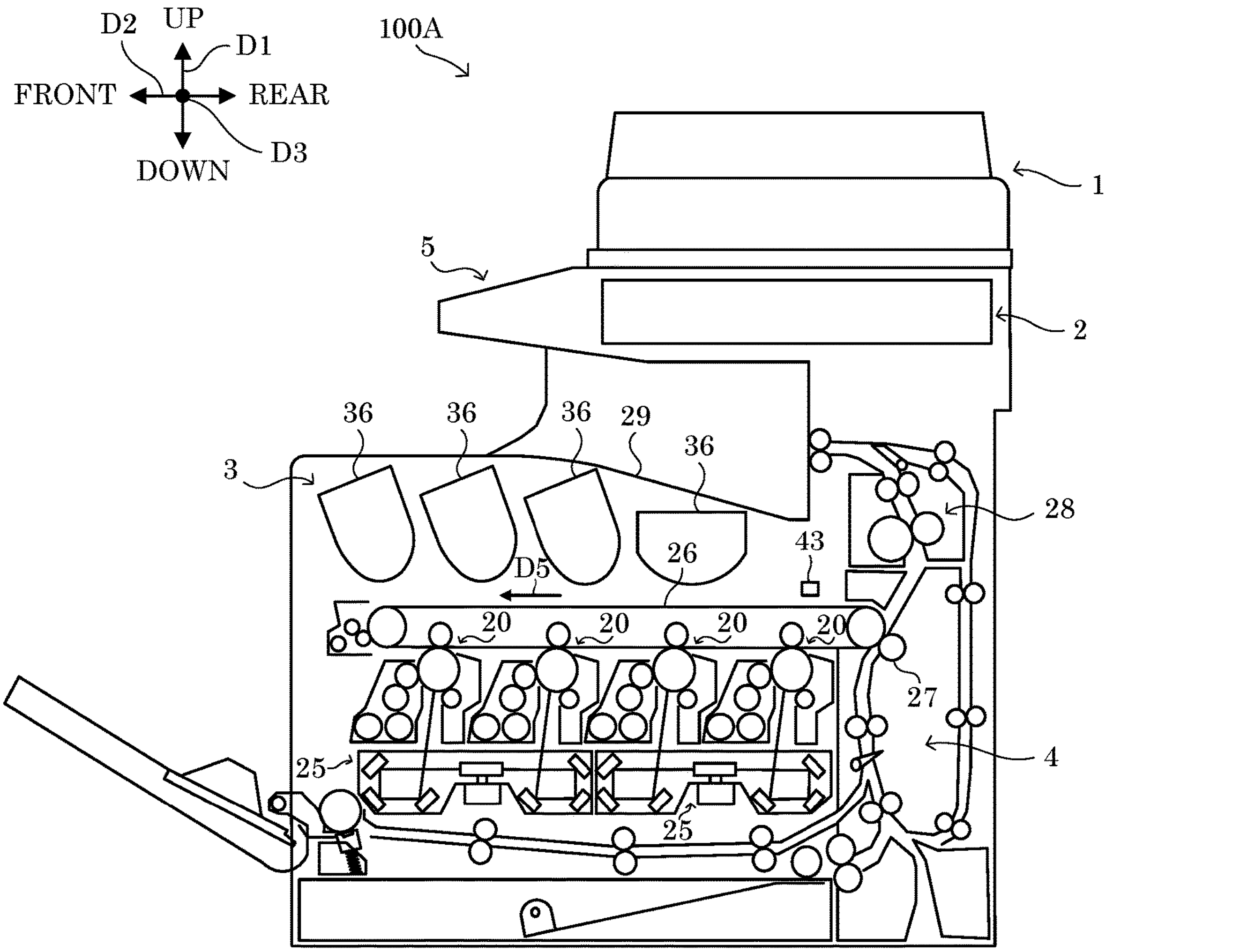
FIG. 1 is a cross-sectional view showing a configuration of an image forming apparatus according to a first embodiment of the present disclosure.
Figure 2:
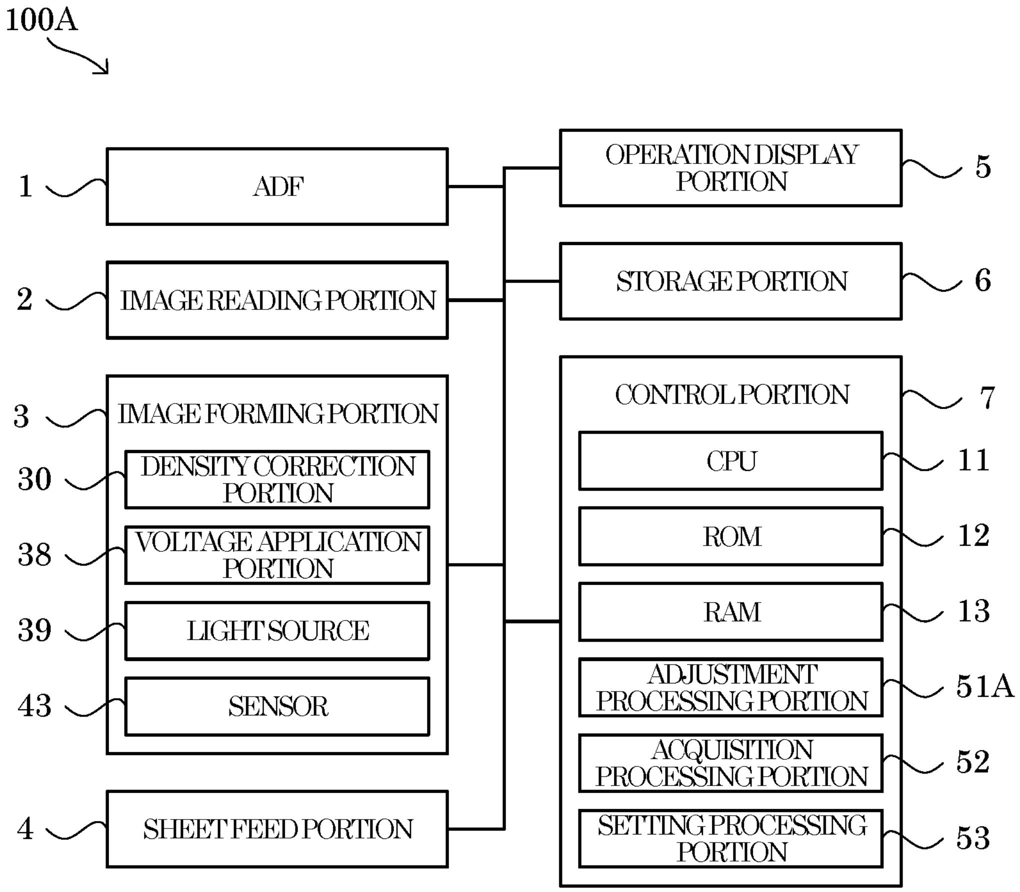
FIG. 2 is a block diagram showing a system configuration of the image forming apparatus according to the first embodiment of the present disclosure.

As shown in FIG. 1 and FIG. 2, the image forming apparatus 100A includes an auto document feeder (ADF) 1, an image reading portion 2, an image forming portion 3, a sheet feed portion 4, an operation display portion 5, a storage portion 6, and a control portion 7.

The ADF 1 conveys a document sheet to be read by the scan function. The ADF 1 includes a document sheet loading portion, a plurality of conveying rollers, a document sheet holder, and a sheet discharge portion.

The image reading portion 2 implements the scan function. The image reading portion 2 includes a document sheet table, a light source, a plurality of mirrors, an optical lens, and a charge coupled device (CCD).

The image forming portion 3 implements the print function. Specifically, the image forming portion 3 forms a color or monochrome image on a sheet supplied from the sheet feed portion 4 in accordance with an electrophotographic method. The image forming portion 3 forms an image using toner.

The sheet feed portion 4 supplies a sheet to the image forming portion 3. The sheet feed portion 4 includes a sheet feed cassette, a manual feed tray, and a plurality of conveying rollers.

The operation display portion 5 is a user interface of the image forming apparatus 100A. The operation display portion 5 includes a display portion such as a liquid crystal display that displays various types of information in response to control instructions from the control portion 7, and an operation portion such as operation keys or a touch panel that inputs various types of information to the control portion 7 in response to user's operations.

The storage portion 6 is a nonvolatile storage device. For example, the storage portion 6 is a nonvolatile memory such as a flash memory. It is noted that the storage portion 6 may be a solid state drive (SSD) or a hard disk drive (HDD).

The control portion 7 performs overall control of the image forming apparatus 100A. As shown in FIG. 2, the control portion 7 includes a CPU 11, a ROM 12, and a RAM 13. The CPU 11 is a processor that executes various arithmetic processes. The ROM 12 is a nonvolatile storage device in which information such as control programs for causing the CPU 11 to execute various processes are stored in advance. The RAM 13 is a volatile or nonvolatile storage device used as a temporary storage memory (work area) for various processes executed by the CPU 11. The CPU 11 performs overall control of the image forming apparatus 100A by executing various control programs stored in the ROM 12 in advance.

It is noted that the control portion 7 may be a control portion provided separately from a main control portion that performs overall control of the image forming apparatus 100A. In addition, the control portion 7 may be composed of an electronic circuit such as an integrated circuit (ASIC).

[Configuration of Image Forming Portion 3]

Figure 3:
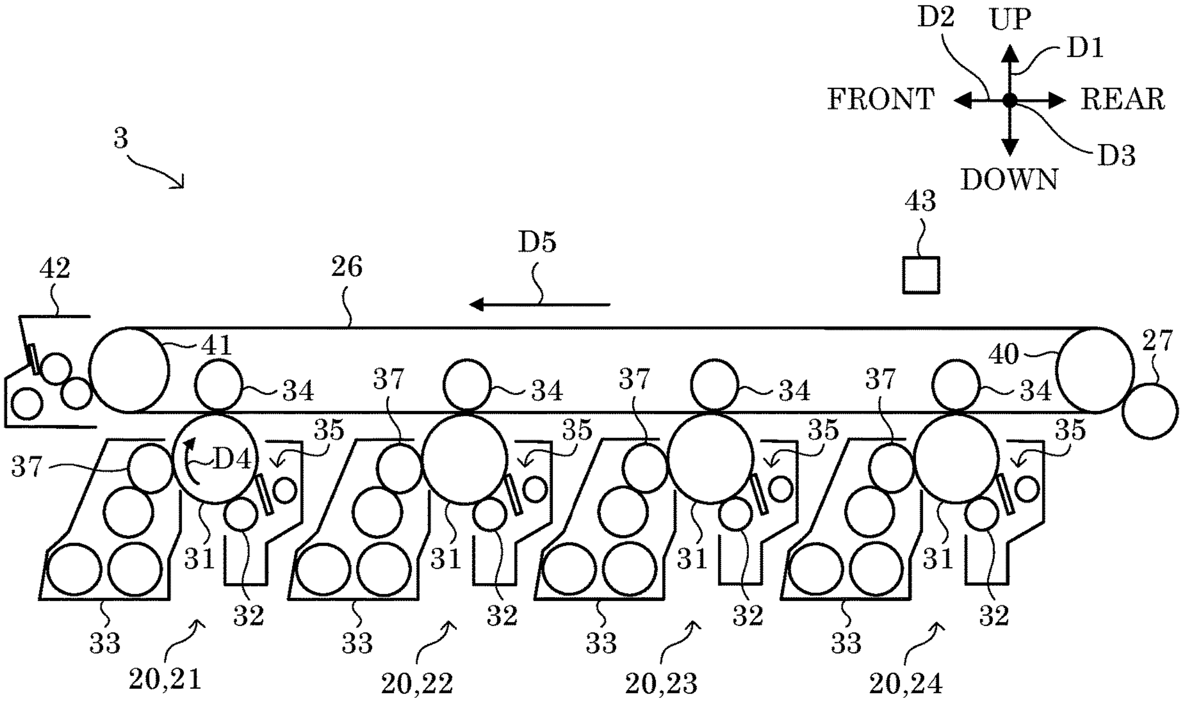
FIG. 3 is a cross-sectional view showing a configuration of an image forming portion of the image forming apparatus according to the first embodiment of the present disclosure.
Figure 4:
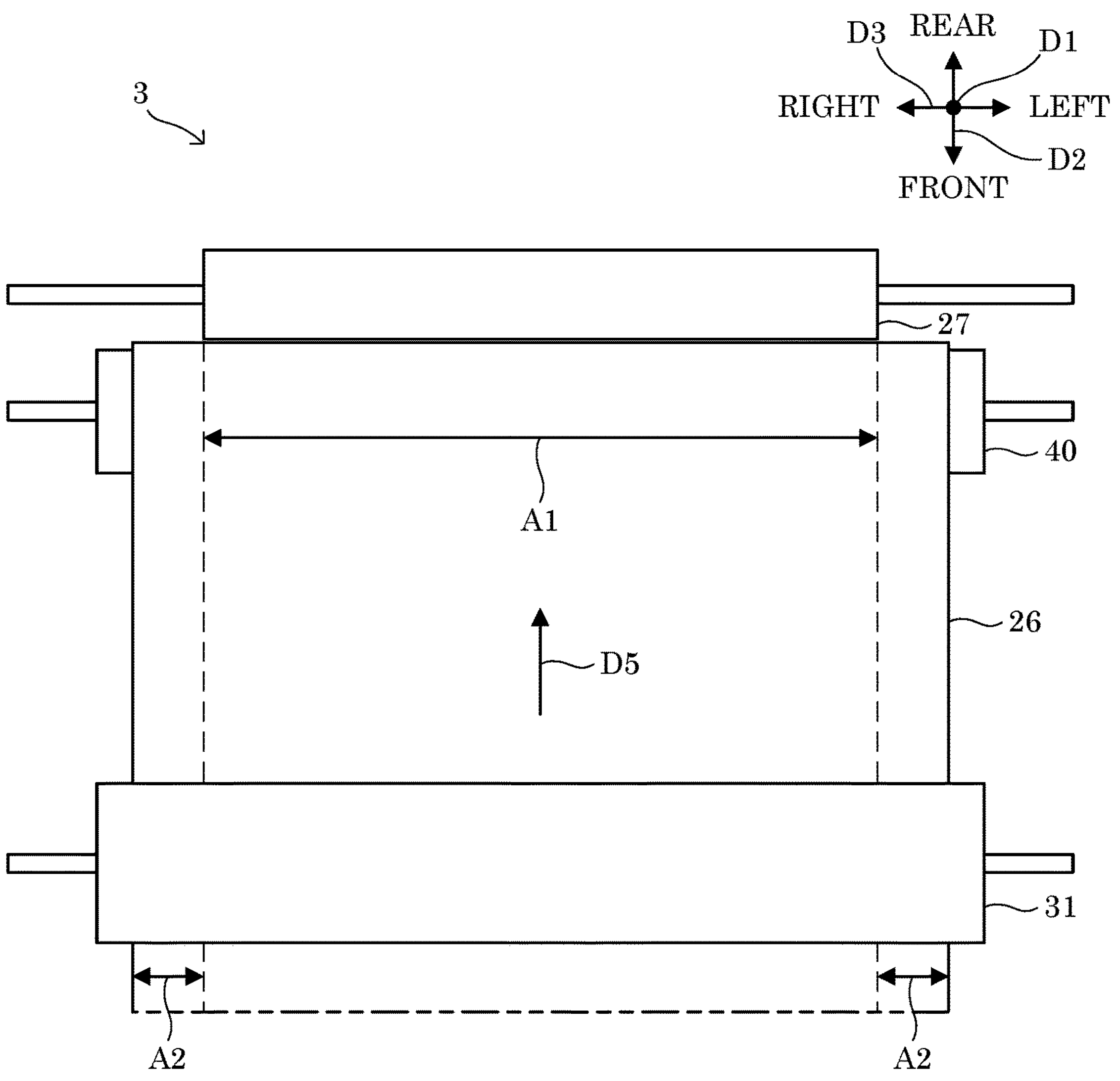
FIG. 4 is a bottom view showing a configuration of an intermediate transfer belt of the image forming apparatus according to the first embodiment of the present disclosure.

Next, a configuration of the image forming portion 3 will be described with reference to FIG. 1 to FIG. 4. Here, FIG. 3 is a cross-sectional view showing a configuration of a plurality of image forming units 20, an intermediate transfer belt 26, and a secondary transfer roller 27. In addition, FIG. 4 is a bottom view showing a configuration of a photoconductor drum 31 of an image forming unit 24, an intermediate transfer belt 26, a drive roller 40, and a secondary transfer roller 27.

As shown in FIG. 1, the image forming portion 3 includes four image forming units 20, two laser scanning units 25, an intermediate transfer belt 26, a secondary transfer roller 27, a fixing device 28, and a sheet discharge tray 29. In addition, as shown in FIG. 2, the image forming portion 3 includes a density correction portion 30, a voltage application portion 38, a light source 39, and a sensor 43.

Of the four image forming units 20, an image forming unit 21 (see FIG. 3) forms a yellow (Y) toner image. Of the four image forming units 20, an image forming unit 22 (see FIG. 3) forms a cyan (C) toner image. Of the four image forming units 20, an image forming unit 23 (see FIG. 3) forms a magenta (M) toner image. Of the four image forming units 20, an image forming unit 24 (see FIG. 3) forms a black (K) toner image. As shown in FIG. 1 and FIG. 3, the four image forming units 20 are arranged in the order of yellow, cyan, magenta, and black from the front side of the image forming apparatus 100A along the front-rear direction D2.

As shown in FIG. 3, each of the image forming units 20 includes a photoconductor drum 31, a charging roller 32, a developing device 33, a primary transfer roller 34, and a drum cleaning member 35. In addition, each of the image forming units 20 includes a toner container 36 shown in FIG. 1.

An electrostatic latent image is formed on the surface of the photoconductor drum 31. The photoconductor drum 31 rotates in a drum rotation direction D4 shown in FIG. 3 under rotational drive power supplied from a motor (not shown). Thus, the photoconductor drum 31 conveys the electrostatic latent image formed on its surface. The photoconductor drum 31 is an example of the image carrier of the present disclosure.

The charging roller 32 charges the surface of the photoconductor drum 31 under application of a preset charging voltage. For example, the charging roller 32 positively charges the surface of the photoconductor drum 31. The surface of the photoconductor drum 31 charged by the charging roller 32 is irradiated with light based on image data emitted from the laser scanning unit 25. Thus, an electrostatic latent image is formed on the surface of the photoconductor drum 31.

The developing device 33 develops the electrostatic latent image formed on the surface of the photoconductor drum 31. The developing device 33 includes a pair of stirring members, a magnet roller, and a developing roller 37 (see FIG. 3). The pair of stirring members stir a developer containing toner and carrier stored inside the developing device 33. For example, the toner contained in the developer is positively charged by friction with the carrier contained in the developer. The magnet roller draws up the developer stirred by the pair of stirring members and supplies the toner contained in the developer to the developing roller 37. The developing roller 37 conveys the toner supplied from the magnet roller to a position facing the photoconductor drum 31. In addition, the developing roller 37 receives application of a preset developing bias voltage and supplies the toner conveyed to the facing position to the photoconductor drum 31. Accordingly, the toner is selectively supplied to the exposed area of the photoconductor drum 31 irradiated with the light emitted from the laser scanning unit 25, and the electrostatic latent image formed on the surface of the photoconductor drum 31 is developed. That is, the developing roller 37 develops the electrostatic latent image formed by the laser scanning unit 25 in accordance with the application of the preset developing bias voltage. The developing roller 37 is an example of the developing portion of the present disclosure. It is noted that the developing device 33 is supplied with toner from the toner container 36.

The voltage application portion 38 is a power source capable of applying the developing bias voltage to the developing roller 37. The voltage application portion 38 is provided corresponding to each of the image forming units 20.

The primary transfer roller 34 is supplied with a preset primary transfer current and transfers the toner image formed on the surface of the photoconductor drum 31 to the outer peripheral surface of the intermediate transfer belt 26. As shown in FIG. 3, the primary transfer roller 34 is provided so as to face the photoconductor drum 31 with the intermediate transfer belt 26 interposed therebetween.

The drum cleaning member 35 removes toner remaining on the surface of the photoconductor drum 31 after the toner image transfer by the primary transfer roller 34.

The density correction portion 30 corrects the density of image data to be formed into an image, based on predetermined table data. Specifically, the density correction portion 30 corrects the density of the image data to be formed into an image so that the density of the image data input to the image forming portion 3 and the density of the image formed by the image forming portion 3 have a linear relationship. That is, the density correction portion 30 executes so-called gamma correction. In addition, the table data is data indicating a gamma table used in the gamma correction.

The density correction portion 30 and the table data are provided for each printing color. The density correction portion 30 corresponding to Y (yellow) corrects the density of Y (yellow) image data based on first table data. The first table data is the table data corresponding to Y (yellow). The density correction portion 30 corresponding to C (cyan) corrects the density of C (cyan) image data based on second table data. The second table data is the table data corresponding to C (cyan). The density correction portion 30 corresponding to M (magenta) corrects the density of M (magenta) image data based on third table data. The third table data is the table data corresponding to M (magenta). The density correction portion 30 corresponding to K (black) corrects the density of K (black) image data based on fourth table data. The fourth table data is the table data corresponding to K (black).

The light source 39 emits light based on the image data after the density correction by the density correction portion 30. The light source 39 is provided for each printing color.

The two laser scanning units 25 emit light based on image data toward the surfaces of the photoconductor drums 31 of the image forming units 20. The two laser scanning units 25 are arranged side by side along the front-rear direction D2.

Of the two laser scanning units 25, the laser scanning unit 25 disposed on the front side emits light based on Y (yellow) image data toward the photoconductor drum 31 of the image forming unit 21. In addition, the laser scanning unit 25 disposed on the front side emits light based on C (cyan) image data toward the photoconductor drum 31 of the image forming unit 22. Specifically, the laser scanning unit 25 disposed on the front side includes a light source 39 corresponding to Y (yellow), a light source 39 corresponding to C (cyan), a first polygon mirror common to Y (yellow) and C (cyan), a first optical path corresponding to Y (yellow), and a second optical path corresponding to C (cyan). The light emitted from the light source 39 corresponding to Y (yellow) is run in a main scanning direction along the left-right direction D3 by the first polygon mirror, and is applied to the photoconductor drum 31 of the image forming unit 21 via a lens and a mirror disposed on the first optical path. The light emitted from the light source 39 corresponding to C (cyan) is run in the main scanning direction by the first polygon mirror, and is applied to the photoconductor drum 31 of the image forming unit 22 via a lens and a mirror disposed on the second optical path.

Of the two laser scanning units 25, the laser scanning unit 25 disposed on the rear side emits light based on M (magenta) image data toward the photoconductor drum 31 of the image forming unit 23. In addition, the laser scanning unit 25 disposed on the rear side emits light based on the K (black) image data toward the photoconductor drum 31 of the image forming unit 24. Specifically, the laser scanning unit 25 disposed on the rear side includes a light source 39 corresponding to M (magenta), a light source 39 corresponding to K (black), a second polygon mirror common to M (magenta) and K (black), a third optical path corresponding to M (magenta), and a fourth optical path corresponding to K (black). The light emitted from the light source 39 corresponding to M (magenta) is run in the main scanning direction by the second polygon mirror, and is applied to the photoconductor drum 31 of the image forming unit 23 via a lens and a mirror disposed on the third optical path. The light emitted from the light source 39 corresponding to K (black) is run in the main scanning direction by the second polygon mirror, and is applied to the photoconductor drum 31 of the image forming unit 24 via a lens and a mirror disposed on the fourth optical path. Each of the laser scanning units 25 runs light emitted from the light source 39 to form an electrostatic latent image on the photoconductor drum 31. The laser scanning unit 25 is an example of the laser scanning portion of the present disclosure.

The intermediate transfer belt 26 is an endless belt member to which a toner image formed on the surface of the photoconductor drum 31 of each of the image forming units 20 is transferred. The intermediate transfer belt 26 is stretched with a predetermined tension by a drive roller 40 (see FIG. 3) and a stretching roller 41 (see FIG. 3). The intermediate transfer belt 26 rotates in a belt rotation direction D5 shown in FIG. 3 as the drive roller 40 rotates under rotational drive power supplied from a motor (not shown). Thus, the intermediate transfer belt 26 conveys the toner image transferred from each of the photoconductor drums 31 to a transfer position for the secondary transfer roller 27 to transfer the toner image onto a sheet. It is noted that the outer peripheral surface of the intermediate transfer belt 26 after the toner image is transferred by the secondary transfer roller 27 is cleaned by a belt cleaning portion 42 (see FIG. 3).

The secondary transfer roller 27 is supplied with a preset secondary transfer current and transfers the toner image transferred to the outer peripheral surface of the intermediate transfer belt 26 to a sheet supplied from the sheet feed portion 4. As shown in FIG. 3, the secondary transfer roller 27 is provided so as to face the drive roller 40 with the intermediate transfer belt 26 interposed therebetween.

As shown in FIG. 4, the size of the secondary transfer roller 27 in the axial direction (left-right direction D3) is smaller than the width of the intermediate transfer belt 26

(the size in the left-right direction D3). Therefore, a non-contact area A2 (see FIG. 4) that does not come into contact with the secondary transfer roller 27 is formed on the outer peripheral surface of the intermediate transfer belt 26. The non-contact area A2 is an area outside a contact area A1 (see FIG. 4) that comes into contact with the secondary transfer roller 27 on the outer peripheral surface of the intermediate transfer belt 26, which includes end portions in the width direction of the intermediate transfer belt 26.

The fixing device 28 fixes the toner image transferred to the sheet by the secondary transfer roller 27 to the sheet.

The sheet to which the toner image has been fixed by the fixing device 28 is discharged to the sheet discharge tray 29.

The sensor 43 detects the density and position of the toner image transferred to the non-contact area A2 (see FIG. 4) on the outer peripheral surface of the intermediate transfer belt 26. For example, the sensor 43 includes a plurality of reflective optical sensors arranged side by side along the left-right direction D3. For example, each of the optical sensors includes a light emitting portion that emits light toward the non-contact area A2 of the intermediate transfer belt 26 and a light receiving portion that receives light emitted from the light emitting portion and reflected by the non-contact area A2 of the intermediate transfer belt 26. As shown in FIG. 3, the sensor 43 is disposed downstream of the transfer position of the toner image by the secondary transfer roller 27 in the belt rotation direction D5 and upstream of the cleaning position of the outer peripheral surface of the intermediate transfer belt 26 by the belt cleaning portion 42 in the belt rotation direction D5. The sensor 43 inputs electric signals corresponding to the density and position of the toner image to be detected to the control portion 7. It is noted that the sensor 43 may be a contact image sensor (CIS).

[Configuration of Control Portion 7]

Next, a configuration of the control portion 7 will be described with reference to FIG. 2.

As shown in FIG. 2, the control portion 7 includes an adjustment processing portion 51A, an acquisition processing portion 52, and a setting processing portion 53.

Specifically, the ROM 12 of the control portion 7 stores in advance a first image quality adjustment program for causing the CPU 11 to function as the aforementioned processing portions. By executing the first image quality adjustment program stored in the ROM 12, the CPU 11 functions as the aforementioned processing portions.

It is noted that the first image quality adjustment program may be recorded on a computer-readable recording medium such as a CD, a DVD, or a flash memory, and may be read from the recording medium and stored in a storage device such as the storage portion 6. In addition, some or all of the processing portions included in the control portion 7 may be constituted by electronic circuits. In addition, the first image quality adjustment program may be a program for causing a plurality of processors to function as the processing portions included in the control portion 7.

During execution of an image forming process using the image forming portion 3, the adjustment processing portion 51A uses toner to adjust the image quality of an output image output by the image forming process. The image forming process is a process of forming an image based on image data on a sheet using the image forming portion 3.

Specifically, each time a predetermined first adjustment condition is satisfied, the adjustment processing portion 51A adjusts one adjustment target selected in accordance with a predetermined specific order among a plurality of adjustment targets related to the image quality of the output image.

Here, the plurality of adjustment targets include the developing bias voltage. When the developing bias voltage corresponding to one of the image forming units 20 changes, the density of the toner image formed by that image forming unit 20 changes. That is, it can be said that the developing bias voltage is an image forming condition related to the image quality (density) of the output image.

In addition, the plurality of adjustment targets include the amount of light emitted from the light source 39. When the amount of light emitted from the light source 39 corresponding to one of the printing colors changes, the density of the toner image based on the electrostatic latent image formed by that light source 39 changes. That is, it can be said that the amount of light emitted from the light source 39 is an image forming condition related to the image quality (density) of the output image.

In addition, the plurality of adjustment targets include a position on the photoconductor drum 31 at which the electrostatic latent image is formed by the laser scanning unit 25. When the position on one of the photoconductor drums 31 at which the electrostatic latent image is formed by the laser scanning unit 25 changes, the position on the sheet at which the toner image of the printing color corresponding to that photoconductor drum 31 is formed changes, causing a color registration error. In other words, it can be said that the position on the photoconductor drum 31 at which the electrostatic latent image is formed by the laser scanning unit 25 is an image forming condition related to the image quality (color registration error) of the output image.

In addition, the plurality of adjustment targets include the table data. When the table data corresponding to one of the printing colors changes, the density of the toner image formed using that table data changes. That is, it can be said that the table data is data related to the image quality (density) of the output image.

The adjustment processing portion 51A executes a first adjustment process when adjusting the developing bias voltage. The first adjustment process is a process of adjusting the developing bias voltage corresponding to each of the image forming units 20. For example, in the first adjustment process, a first detection toner image of Y (yellow) is formed in the non-contact area A2 (see FIG. 4) of the intermediate transfer belt 26. The first detection toner image includes a plurality of first partial toner images arranged along the belt rotation direction D5 of the intermediate transfer belt 26. Each of the first partial toner images is formed based on common image data. In addition, the plurality of first partial toner images are different from each other in the voltage value of the developing bias voltage applied to the developing roller 37 of the image forming unit 21 during development. In the first adjustment process, the sensor 43 is used to detect the density of each of the first partial toner images included in the first detection toner image formed on the intermediate transfer belt 26. In addition, in the first adjustment process, a linear expression indicating the relationship between the voltage value of the developing bias voltage corresponding to the image forming unit 21 and the density of the toner image is obtained based on the result of the detection of the density of each of the first partial toner images. In the first adjustment process, the developing bias voltage corresponding to the image forming unit 21 is adjusted based on a voltage value (hereinafter referred to as a "first target value") corresponding to a predetermined density calculated using the obtained linear expression. The developing bias voltages corresponding to the other image forming units 20 are also adjusted in the same manner as the developing bias voltage corresponding to the image forming unit 21.

In addition, the adjustment processing portion 51A executes a second adjustment process when adjusting the amount of light emitted from the light source 39. The second adjustment process is a process of adjusting the amount of light emitted from the light source 39 corresponding to each printing color. For example, in the second adjustment process, a second detection toner image of Y (yellow) is formed in the non-contact area A2 (see FIG. 4) of the intermediate transfer belt 26. The second detection toner image includes a plurality of second partial toner images arranged along the belt rotation direction D5 of the intermediate transfer belt 26. Each of the second partial toner images is formed based on common image data. The plurality of second partial toner images are different from each other in the amount of light emitted from the light source 39 corresponding to Y (yellow) during formation of the electrostatic latent image. In the second adjustment process, the sensor 43 is used to detect the density of each of the second partial toner images included in the second detection toner image formed on the intermediate transfer belt 26. In addition, in the second adjustment process, a linear expression indicating the relationship between the amount of light emitted from the light source 39 corresponding to Y (yellow) and the density of the toner image is obtained based on the result of the detection of the density of each of the second partial toner images. Then, in the second adjustment process, the amount of light emitted from the light source 39 corresponding to Y (yellow) is adjusted based on the amount of light corresponding to a predetermined density (hereinafter referred to as a "second target value") calculated using the obtained linear expression. The amounts of light emitted from the light sources 39 corresponding to the other printing colors are also adjusted in the same manner as the amount of light emitted from the light source 39 corresponding to Y (yellow).

In addition, the adjustment processing portion 51A executes a third adjustment process when adjusting the position on the photoconductor drum 31 at which the electrostatic latent image is formed by the laser scanning unit 25. The third adjustment process is a process of adjusting the position on each of the photoconductor drums 31 at which the electrostatic latent image is formed. For example, in the third adjustment process, a third detection toner image of Y (yellow) is formed in the non-contact area A2 (see FIG. 4) of the intermediate transfer belt 26. For example, the third detection toner image is a rectangular toner image formed based on predetermined image data. In the third adjustment process, the sensor 43 is used to detect the position (the position in the left-right direction D3 and the position in the belt rotation direction D5) of the third detection toner image formed on the intermediate transfer belt 26. Then, in the third adjustment process, the position on the photoconductor drum 31 at which the electrostatic latent image is formed by the image forming unit 21 is adjusted based on the result of the detection of the position of the third detection toner image. For example, in the third adjustment process, when the detection position of the third detection toner image in the left-right direction D3 deviates from a predetermined position, the position of the lens disposed on the first optical path is adjusted so that the deviation is eliminated. In addition, in the third adjustment process, when the detection position of the third detection toner image in the belt rotation direction D5 deviates from a predetermined position, the posture of the mirror disposed on the first optical path is adjusted so that the deviation is eliminated. The position on the photoconductor drum 31 at which the electrostatic latent image is formed by each of the other image forming units 20 is also adjusted in the same manner as the position on the photoconductor drum 31 at which the electrostatic latent image is formed by the image forming unit 21.

In addition, the adjustment processing portion 51A executes a fourth adjustment process when adjusting the table data. The fourth adjustment process is a process of adjusting the table data corresponding to each printing color. For example, in the fourth adjustment process, a fourth detection toner image of Y (yellow) is formed in the non-contact area A2 (see FIG. 4) of the intermediate transfer belt 26. The fourth detection toner image includes a plurality of fourth partial toner images arranged along the belt rotation direction D5 of the intermediate transfer belt 26. The plurality of fourth partial toner images are formed based on a plurality of image data items with different Y (yellow) densities. Therefore, the plurality of fourth partial toner images formed on the intermediate transfer belt 26 have different densities. In the fourth adjustment process, the sensor 43 is used to detect the density of each of the fourth partial toner images included in the fourth detection toner image formed on the intermediate transfer belt 26. In addition, in the fourth adjustment process, an expression indicating the relationship between the density of Y (yellow) image data input to the image forming portion 3 and the density of the toner image formed on the intermediate transfer belt 26 is obtained based on the result of the detection of the density of each of the fourth partial toner images. Then, in the fourth adjustment process, the table data corresponding to Y (yellow) is adjusted based on the obtained expression so that the density of Y (yellow) image data input to the image forming portion 3 and the density of the toner image formed on the intermediate transfer belt 26 have a linear relationship. The table data corresponding to each of the other printing colors is also adjusted in the same manner as the table data corresponding to Y (yellow).

For example, the specific order is an order in which the plurality of adjustment targets are arranged in descending order of the degree of influence on the image quality of the output image. Specifically, the specific order is the order of the developing bias voltage, the amount of light emitted from the light source 39, the position on the photoconductor drum 31 at which the electrostatic latent image is formed by the laser scanning unit 25, and the table data. That is, when the image forming process is started, the first adjustment process is executed first, the second adjustment process is executed second, the third adjustment process is executed third, and the fourth adjustment process is executed fourth. In addition, after the fourth adjustment process, the first adjustment process is executed, and thereafter, a plurality of the adjustment processes are repeatedly executed in accordance with the specific order. It is noted that the specific order may be the order of the position on the photoconductor drum 31 at which the electrostatic latent image is formed by the laser scanning unit 25, the developing bias voltage, the amount of light emitted from the light source 39, and the table data.

For example, the adjustment processing portion 51A adjusts one adjustment target selected in accordance with the specific order every time the number of output images formed (the number of images formed) by the image forming process reaches a multiple of a predetermined first reference value. That is, the first adjustment condition is that the number of output images formed (the number of images formed) by the image forming process reaches a multiple of the first reference value. For example, the first reference value is "30", "50", or "100".

It is noted that the adjustment order and the adjustment interval of the plurality of adjustment targets may be arbitrarily set. In addition, the plurality of adjustment targets may include at least two of the developing bias voltage, the amount of light emitted from the light source 39, the position on the photoconductor drum 31 at which the electrostatic latent image is formed by the laser scanning unit 25, and the table data, and may include processes different from these. In addition, the adjustment processing portion 51A may periodically adjust only one of the developing bias voltage, the amount of light emitted from the light source 39, the position on the photoconductor drum 31 at which the electrostatic latent image is formed by the laser scanning unit 25, and the table data.

By the way, in the image forming apparatus 100A, the amount of charge of the toner, the temperature inside the apparatus, and the like tend to become unstable for a while from the start of the image forming process. When the amount of charge of the toner, the temperature inside the apparatus, and the like become unstable, the image quality of the output image varies. Specifically, when the amount of charge of the toner changes, the density of the output image varies. In addition, when the temperature inside the apparatus changes, the amount of charge of the toner changes, and the density of the output image varies. In addition, when the temperature inside the apparatus changes, the shape and the refractive index of an optical member such as a lens disposed in the laser scanning unit 25 change, and the position at which the output image is formed varies. On the other hand, by setting the frequency of adjustment of the image quality of the output image to be high for a while from the start of the image forming process, the variation in the image quality of the output image can be effectively suppressed.

However, in the image forming apparatus 100A, when the next image forming process is executed immediately after the end of the immediately preceding image forming process, the amount of charge of the toner and the temperature inside the apparatus may be stable even immediately after the start of the next image forming process. Therefore, if the frequency of adjustment of the image quality of the output image is always set to be high when the image forming process is started, unnecessary adjustments are made, thereby causing wasteful toner consumption.

In contrast, the image forming apparatus 100A according to the embodiment of the present disclosure can suppress the variation in the image quality of the output image and reduce the amount of toner used for adjusting the image quality of the output image, as will be described below.

The acquisition processing portion 52 acquires variation amount information related to the amount of variation in a predetermined state value related to the image forming portion 3 caused by the start of the image forming process.

Specifically, the state value is information related to the state of the image forming portion 3, and includes both the amount of charge of the toner and the temperature of the image forming portion 3. In addition, the variation amount information includes an elapsed time from the end of the immediately preceding image forming process. It is noted that the state value may include only one of the amount of charge of the toner and the temperature of the image forming portion 3.

The amount of charge of the toner when the image forming portion 3 is in a stopped state decreases over time. Therefore, the longer the elapsed time from the end of the immediately preceding image forming process, the greater the amount of variation (increase) in the amount of charge of the toner caused by the start of the next image forming process. Accordingly, it can be said that the elapsed time from the end of the immediately preceding image forming process is information related to the amount of variation in the amount of charge of the toner caused by the start of the image forming process.

In addition, the temperature of the image forming portion 3 when the image forming portion 3 is in the stopped state decreases over time toward the temperature of the location where the image forming apparatus 100A is installed. Therefore, the longer the elapsed time from the end of the immediately preceding image forming process, the greater the amount of variation (increase) in the temperature of the image forming portion 3 caused by the start of the next image forming process. Accordingly, it can be said that the elapsed time from the end of the immediately preceding image forming process is information related to the amount of variation in the temperature of the image forming portion 3 caused by the start of the image forming process.

For example, when the image forming process is ended, the acquisition processing portion 52 records the time at the end of the image forming process. In addition, when the image forming process is started, the acquisition processing portion 52 acquires the elapsed time from the end of the immediately preceding image forming process based on the current time and the time recorded at the end of the immediately preceding image forming process. It is noted that the time may be acquired using a real-time clock (RTC) (not shown) provided in the control portion 7.

It is noted that the variation amount information may include a difference (hereinafter referred to as a "consumption amount difference") between the consumption amount of the toner during formation of the last output image in the immediately preceding image forming process and the consumption amount of the toner during formation of the first output image in the next image forming process. When the consumption amount difference is large, a change in the residence time of the toner in the developing device 33 is large. The longer the residence time of the toner in the developing device 33, the greater the opportunity for the toner to be frictionally charged with the carrier, thereby increasing the amount of charge of the toner. Therefore, it can be said that the consumption amount difference is information related to the amount of variation in the amount of charge of the toner caused by the start of the image forming process. For example, the acquisition processing portion 52 may acquire the consumption amount difference based on the coverage rate of the last output image in the immediately preceding image forming process and the coverage rate of the first output image in the next image forming process.

In addition, the variation amount information may include a difference (hereinafter referred to as a "temperature difference") between the temperature of the image forming portion 3 at the end of the immediately preceding image forming process and the temperature of the image forming portion 3 at the start of the next image forming process. For example, the acquisition processing portion 52 may acquire the temperature difference using a temperature sensor (not shown) provided inside the housing of the image forming apparatus 100A.

The setting processing portion 53 sets the frequency of adjustment of the image quality of the output image by the adjustment processing portion 51A based on the variation amount information acquired by the acquisition processing portion 52.

For example, when the elapsed time from the end of the immediately preceding image forming process acquired by the acquisition processing portion 52 does not exceed a predetermined reference time, the setting processing portion 53 sets the frequency of adjustment to a predetermined first frequency. For example, the setting processing portion 53 sets the first reference value to "50". In this case, the first frequency is once every time the number of output images formed (the number of images formed) by the image forming process reaches a multiple of "50".

In addition, the setting processing portion 53 sets the frequency of adjustment to a second frequency higher than the first frequency when the elapsed time from the end of the immediately preceding image forming process acquired by the acquisition processing portion 52 exceeds the reference time. For example, the setting processing portion 53 sets the first reference value to "30". In this case, the second frequency is once every time the number of output images formed (the number of images formed) by the image forming process reaches a multiple of "30".

It is noted that the first frequency and the second frequency may be arbitrarily set in accordance with a predetermined operation on the operation display portion 5.

When the frequency of adjustment is set to a frequency higher than a predetermined reference frequency, the setting processing portion 53 decreases the frequency of adjustment to the reference frequency in response to an increase in the number of outputs of the output image. For example, the reference frequency is once every time the number of output images formed (the number of images formed) by the image forming process reaches a multiple of "100". It is noted that the reference frequency may be the same as the first frequency.

For example, when the frequency of adjustment is set to the second frequency and the number of output images formed (the number of images formed) by the image forming process reaches "300", the setting processing portion 53 decreases the frequency of adjustment to the first frequency. In addition, the setting processing portion 53 decreases the frequency of adjustment to the reference frequency when the number of output images formed (the number of images formed) by the image forming process reaches "500" after the frequency of adjustment is decreased to the first frequency.

In addition, when the frequency of adjustment is set to the first frequency and the number of output images formed (the number of images formed) by the image forming process reaches "500", the setting processing portion 53 decreases the frequency of adjustment to the reference frequency.

It is noted that the setting processing portion 53 may set the frequency of adjustment to the first frequency when the consumption amount difference acquired by the acquisition processing portion 52 does not exceed a predetermined first specific value. In addition, the setting processing portion 53 may set the frequency of adjustment to the second frequency when the consumption amount difference acquired by the acquisition processing portion 52 exceeds the first specific value.

In addition, the setting processing portion 53 may set the frequency of adjustment to the first frequency when the temperature difference acquired by the acquisition processing portion 52 does not exceed a predetermined second specific value. In addition, the setting processing portion 53 may set the frequency of adjustment to the second frequency when the temperature difference acquired by the acquisition processing portion 52 exceeds the second specific value.

In addition, the setting processing portion 53 may set the frequency of adjustment to the second frequency when the elapsed time from the end of the immediately preceding image forming process acquired by the acquisition processing portion 52 does not exceed the reference time and the consumption amount difference acquired by the acquisition processing portion 52 exceeds the first specific value. In addition, the setting processing portion 53 may set the frequency of adjustment to the second frequency when the elapsed time from the end of the immediately preceding image forming process acquired by the acquisition processing portion 52 does not exceed the reference time and the temperature difference acquired by the acquisition processing portion 52 exceeds the second specific value.

[First Image Quality Adjustment Process]

Figure 5:
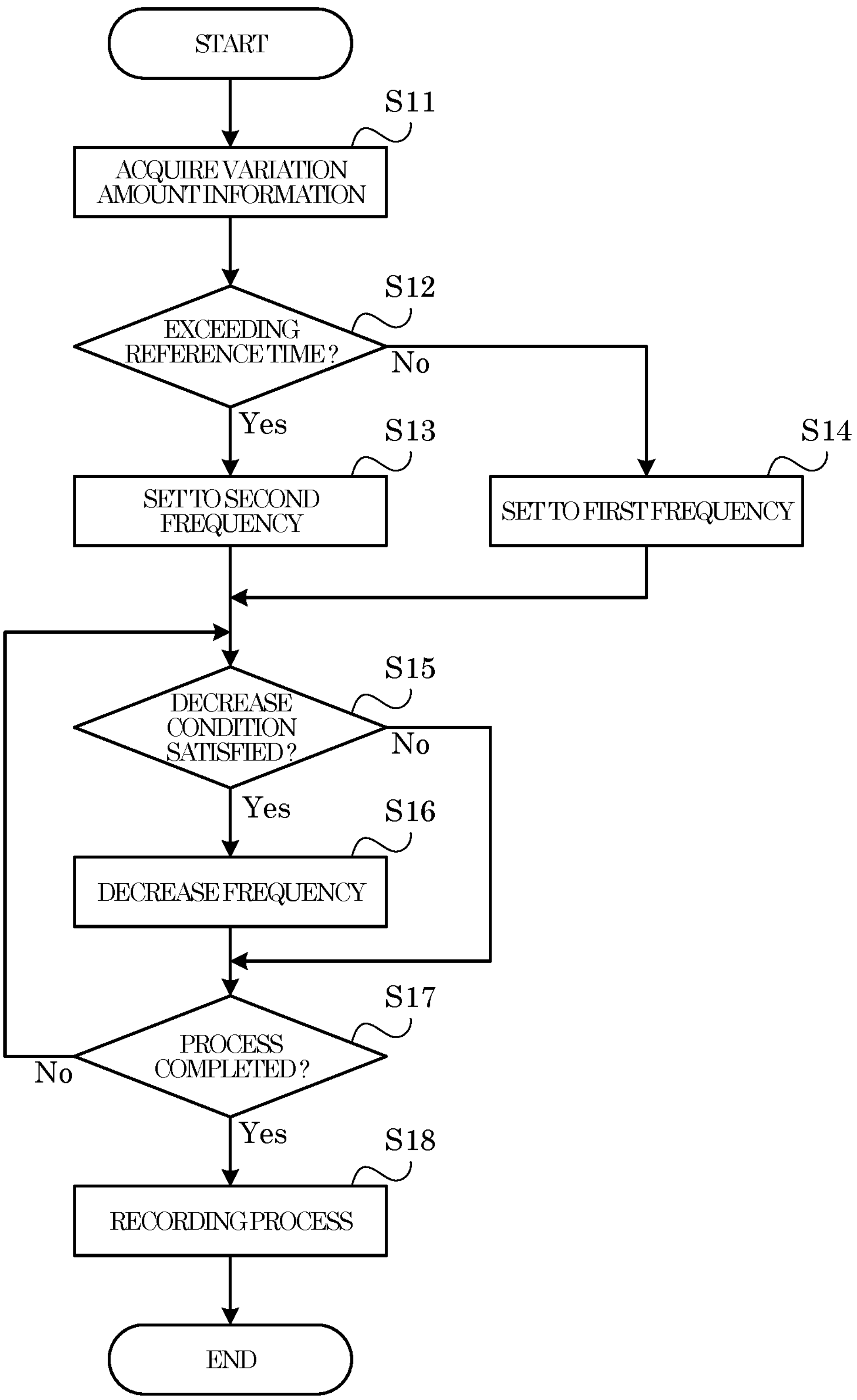
FIG. 5 is a flowchart showing an example of a first image quality adjusting process executed in the image forming apparatus according to the first embodiment of the present disclosure.

An image quality adjustment method according to the present disclosure will be described below with reference to FIG. 5, along with an example of the procedure of a first image quality adjustment process executed by the control portion 7 in the image forming apparatus 100A. Here, steps S11, S12, . . . represent the numbers of the processing procedure (steps) executed by the control portion 7. It is noted that, the first image quality adjusting process is executed together with the image forming process when the image forming process is executed.

<Step S11>

First, in step S11, the control portion 7 acquires the variation amount information. Here, the process of step S11 is an example of the acquisition step in the present disclosure, and is executed by the acquisition processing portion 52 of the control portion 7.

Specifically, the control portion 7 acquires the elapsed time (the variation amount information) from the end of the immediately preceding image forming process based on the current time and the time at the end of the immediately preceding image forming process. The time at the end of the immediately preceding image forming process is recorded by the process of step S18 of the immediately preceding first image quality adjustment process.

<Step S12>

In step S12, the control portion 7 determines whether or not the elapsed time from the end of the immediately preceding image forming process acquired in step S11 exceeds the reference time.

Here, when the control portion 7 determines that the elapsed time exceeds the reference time (Yes in S12), the control portion 7 shifts the processing to step S13. In addition, when the elapsed time does not exceed the reference time (No in S12), the control portion 7 shifts the processing to step S14.

<Step S13>

In step S13, the control portion 7 sets the frequency of adjustment of the image quality of the output image to the second frequency.

<Step S14>

In step S14, the control portion 7 sets the frequency of adjustment of the image quality of the output image to the first frequency. Here, the processing from step S12 to step S14 is an example of the setting step in the present disclosure, and is executed by the setting processing portion 53 of the control portion 7.

<Step S15>

In step S15, the control portion 7 determines whether or not a predetermined decrease condition is satisfied.

Specifically, when the frequency of adjustment is set to the second frequency by the process of step S13, the control portion 7 determines that the decrease condition is satisfied when the number of output images formed (the number of images formed) by the image forming process reaches "300". In addition, the control portion 7 determines that the decrease condition is satisfied when the number of output images formed (the number of images formed) by the image forming process reaches "500" after the frequency of adjustment is decreased to the first frequency. In addition, when the frequency of adjustment is set to the first frequency by the process of step S14, the control portion 7 determines that the decrease condition is satisfied when the number of output images formed (the number of images formed) by the image forming process reaches "500".

Here, when the control portion 7 determines that the decrease condition is satisfied (Yes in S15), the control portion 7 shifts the processing to step S16. When the decrease condition is not satisfied (No in S15), the control portion 7 shifts the processing to step S17.

<Step S16>

In step S16, the control portion 7 decreases the frequency of adjustment of the image quality of the output image. The processes of step S15 and step S16 are executed by the setting processing portion 53 of the control portion 7.

Specifically, when the frequency of adjustment is set to the second frequency by the process of step S13, the control portion 7 decreases the frequency of adjustment to the first frequency when the first decrease condition is satisfied. In addition, the control portion 7 decreases the frequency of adjustment to the reference frequency when the next decrease condition is satisfied after the frequency of adjustment is decreased to the first frequency. In addition, when the frequency of adjustment is set to the first frequency by the process of step S14, the control portion 7 decreases the frequency of adjustment to the reference frequency when the decrease condition is satisfied.

The state of the image forming portion 3 stabilizes as the execution time of the image forming process becomes longer. That is, by executing the process of step S16, the frequency of adjustment can be decreased as the state of the image forming portion 3 stabilizes.

In the image forming apparatus 100A, during execution of the image forming process, the image quality of the output image is adjusted at the frequency of adjustment set in step S13, step S14, or step S16 of the first image quality adjustment process. Specifically, in the image forming apparatus 100A, each time the first adjustment condition corresponding to the frequency of adjustment set in step S13, step S14, or step S16 is satisfied during execution of the image forming process, one adjustment target selected in accordance with the specific order among the plurality of adjustment targets is adjusted. The process of adjusting the image quality of the output image is an example of the adjustment step in the present disclosure, and is executed by the adjustment processing portion 51A of the control portion 7.

<Step S17>

In step S17, the control portion 7 determines whether or not the image forming process has been completed.

Here, when the control portion 7 determines that the image forming process has been completed (Yes in S17), the control portion 7 shifts the processing to step S18. In addition, when the image forming process has not been completed (No in S17), the control portion 7 shifts the processing to step S15.

<Step S18>

In step S18, the control portion 7 records the time at the end of the image forming process. The process of step S18 is executed by the acquisition processing portion 52 of the control portion 7.

As described above, in the image forming apparatus 100A, the frequency of adjustment of the image quality of the output image is set based on the variation amount information related to the amount of variation in the state value related to the image forming portion 3 caused by the start of the image forming process. Thus, the frequency of adjustment can be set in accordance with how easily the state of the image forming portion 3 varies for a while from the start of the image forming process. Accordingly, it is possible to suppress the variation in the image quality of the output image and reduce the amount of toner used for adjusting the image quality of the output image.

By the way, in the image forming apparatus 100A, the amount of charge of the toner, the temperature inside the apparatus, and the like tend to become unstable for a while from the start of the image forming process. When the amount of charge of the toner, the temperature inside the apparatus, and the like become unstable, the image quality of the output image varies. On the other hand, when the image forming process is started, by sequentially adjusting the plurality of adjustment targets, starting from the first adjustment target in the specific order, that is, the adjustment target having the greatest influence on the image quality, among the plurality of adjustment targets, the variation in the image quality of the output image immediately after the start of the image forming process can be effectively suppressed.

However, in the image forming apparatus 100A, when the next image forming process is executed immediately after the end of the immediately preceding image forming process, the amount of charge of the toner and the temperature inside the apparatus may be stable even immediately after the start of the next image forming process. In this case, the variation in the image quality of the output image is suppressed by sequentially adjusting the plurality of adjustment targets, starting from the adjustment target following the adjustment target adjusted immediately before in the specific order, rather than the first adjustment target in the specific order, among the plurality of adjustment targets, because the adjustment intervals of the adjustment targets do not vary. In other words, when the image forming process is started, if the plurality of adjustment targets are always adjusted sequentially, starting from the first adjustment target in the specific order among the plurality of adjustment targets, the variation in the image quality of the output image immediately after the start of the image forming process may not be suppressed.

In contrast, an image forming apparatus 100B according to a second embodiment of the present disclosure can suppress the variation in the quality of the output image immediately after the start of the image forming process, as will be described below.

Second Embodiment

Figure 6:
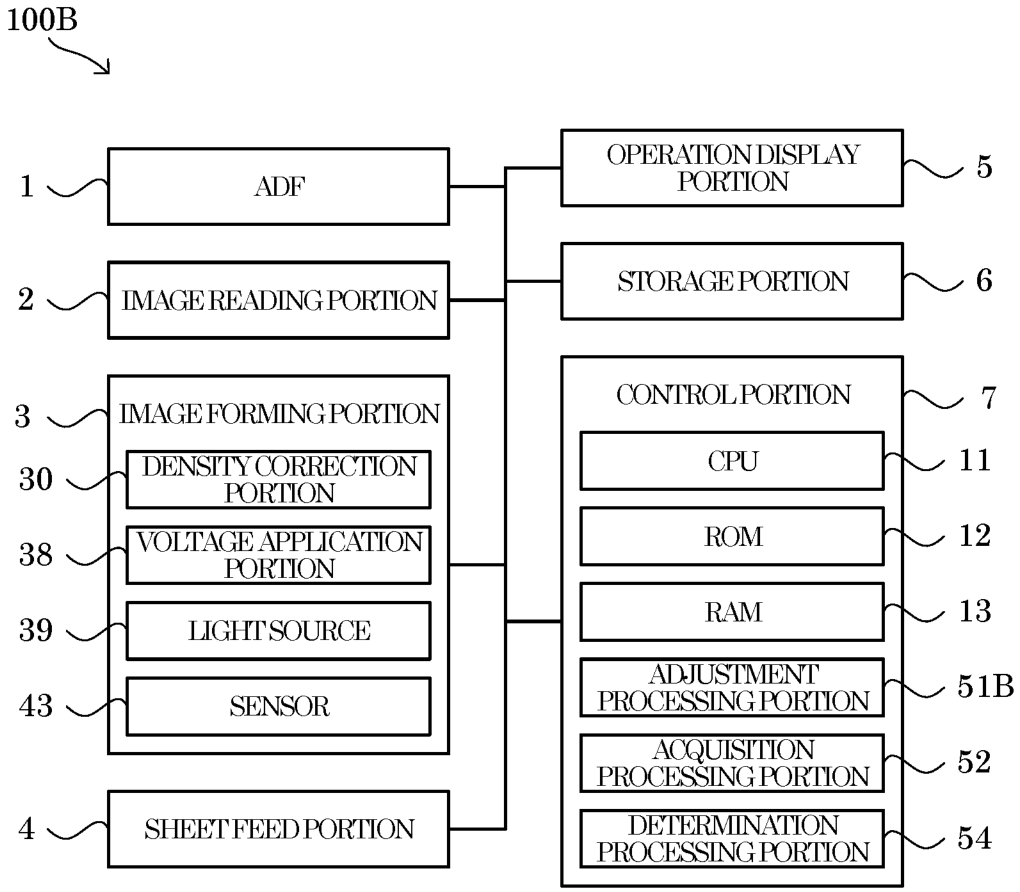
FIG. 6 is a block diagram showing a system configuration of an image forming apparatus according to a second embodiment of the present disclosure.

A configuration of the image forming apparatus 100B according to the second embodiment of the present disclosure will be described below with reference to FIG. 6.

The image forming apparatus 100B has the same configuration as the image forming apparatus 100A except for the configuration of the control portion 7. Specifically, the control portion 7 of the image forming apparatus 100B includes an adjustment processing portion 51B and a determination processing portion 54 in place of the adjustment processing portion 51A and the setting processing portion 53. Only the parts of the configuration of the image forming apparatus 100B that are different from that of the image forming apparatus 100A will be described below. It is noted that the control portion 7 of the image forming apparatus 100B may include the setting processing portion 53.

Each time a predetermined second adjustment condition is satisfied during execution of the image forming process using the image forming portion 3, the adjustment processing portion 51B adjusts one adjustment target selected in accordance with the specific order among the plurality of adjustment targets related to the image quality of the output image output by the image forming process using the toner.

That is, the second adjustment condition is that the number of output images formed (the number of images formed) by the image forming process reaches a multiple of a predetermined second reference value. For example, the second reference value is "30", "50", or "100".

The determination processing portion 54 determines the adjustment target to be adjusted first after the start of the image forming process by the adjustment processing portion 51B, based on the variation amount information acquired by the acquisition processing portion 52.

For example, the determination processing portion 54 determines the adjustment target following the adjustment target adjusted immediately before in the specific order as the adjustment target to be adjusted first after the start of the image forming process, when the elapsed time from the end of the immediately preceding image forming process acquired by the acquisition processing portion 52 does not exceed the reference time. For example, when the elapsed time from the end of the immediately preceding image forming process acquired by the acquisition processing portion 52 does not exceed the reference time and the adjustment target adjusted last in the immediately preceding image forming process is the development bias voltage, the determination processing portion 54 determines the amount of light emitted from the light source 39 which is next to the development bias voltage adjusted immediately before in the specific order as the adjustment target to be adjusted first after the start of the image forming process.

In addition, the determination processing portion 54 determines the first adjustment target in the specific order, that is, the developing bias voltage, as the adjustment target to be adjusted first after the start of the image forming process, when the elapsed time from the end of the immediately preceding image forming process acquired by the acquisition processing portion 52 exceeds the reference time.

It is noted that the determination processing portion 54 may determine the adjustment target following the adjustment target adjusted immediately before in the specific order as the adjustment target to be adjusted first after the start of the image forming process, when the consumption amount difference acquired by the acquisition processing portion 52 does not exceed the first specific value. In addition, the determination processing portion 54 may determine the first adjustment target in the specific order as the adjustment target to be adjusted first after the start of the image forming process, when the consumption amount difference acquired by the acquisition processing portion 52 exceeds the first specific value.

In addition, the determination processing portion 54 may determine the adjustment target following the adjustment target adjusted immediately before in the specific order as the adjustment target to be adjusted first after the start of the image forming process, when the temperature difference acquired by the acquisition processing portion 52 does not exceed the second specific value. In addition, the determination processing portion 54 may determine the first adjustment target in the specific order as the adjustment target to be adjusted first after the start of the image forming process, when the temperature difference acquired by the acquisition processing portion 52 exceeds the second specific value.

In addition, the determination processing portion 54 may determine the first adjustment target in the specific order as the adjustment target to be adjusted first after the start of the image forming process, when the elapsed time from the end of the immediately preceding image forming process acquired by the acquisition processing portion 52 does not exceed the reference time and the consumption amount difference acquired by the acquisition processing portion 52 exceeds the first specific value. In addition, the determination processing portion 54 may determine the first adjustment target in the specific order as the adjustment target to be adjusted first after the start of the image forming process, when the elapsed time from the end of the immediately preceding image forming process acquired by the acquisition processing portion 52 does not exceed the reference time and the temperature difference acquired by the acquisition processing portion 52 exceeds the second specific value.

[Second Image Quality Adjustment Process]

Figure 7:
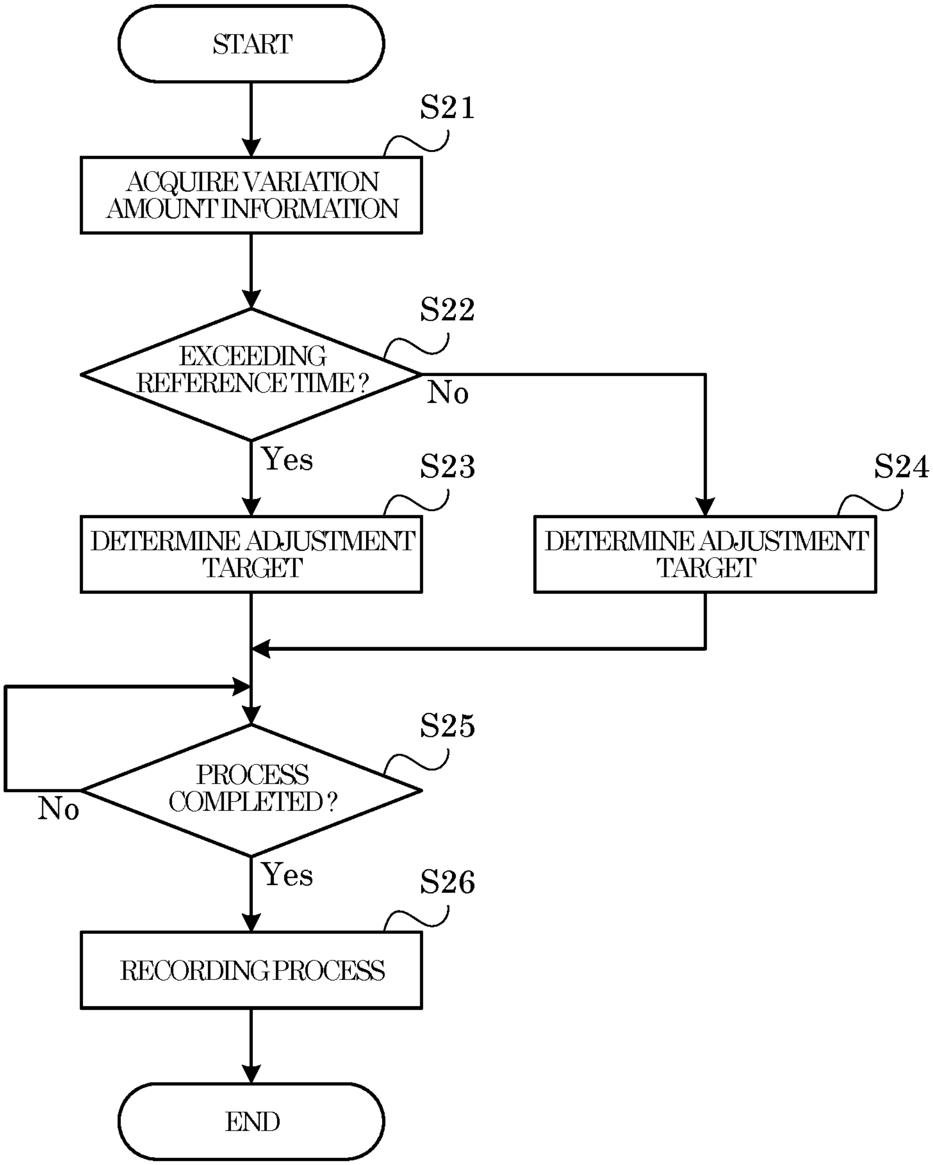
FIG. 7 is a flowchart showing an example of a second image quality adjusting process executed in the image forming apparatus according to the second embodiment of the present disclosure.

An image quality adjustment method according to the present disclosure will be described below with reference to FIG. 7, along with an example of the procedure of a second image quality adjustment process executed by the control portion 7 in the image forming apparatus 100B. It is noted that the second image quality adjusting process is executed together with the image forming process when the image forming process is executed.

<Step S21>

First, in step S21, the control portion 7 acquires the variation amount information. Here, the process of step S21 is an example of the acquisition step in the present disclosure, and is executed by the acquisition processing portion 52 of the control portion 7.

Specifically, the control portion 7 acquires the elapsed time (the variation amount information) from the end of the immediately preceding image forming process based on the current time and the time at the end of the immediately preceding image forming process. It is noted that the time at the end of the immediately preceding image forming process is recorded by the process of step S26 of the immediately preceding second image quality adjustment process.

<Step S22>

In step S22, the control portion 7 determines whether or not the elapsed time from the end of the immediately preceding image forming process acquired in step S21 exceeds the reference time.

Here, when the control portion 7 determines that the elapsed time exceeds the reference time (Yes in S22), the control portion 7 shifts the processing to step S23. In addition, when the elapsed time does not exceed the reference time (No in S22), the control portion 7 shifts the processing to step S24.

<Step S23>

In step S23, the control portion 7 determines the first adjustment target in the specific order, that is, the developing bias voltage, as the adjustment target to be adjusted first after the start of the image forming process.

<Step S24>

In step S24, the control portion 7 determines the adjustment target following the adjustment target adjusted immediately before in the specific order as the adjustment target to be adjusted first after the start of the image forming process. Here, the processing from step S22 to step S24 is an example of the determination step in the present disclosure, and is executed by the determination processing portion 54 of the control portion 7.

In the image forming apparatus 100B, when the process of step S23 is executed, the plurality of adjustment targets are adjusted sequentially in accordance with the order starting from the developing bias voltage in accordance with the specific order. In addition, in the image forming apparatus 100B, when the process of step S24 is executed, the plurality of adjustment targets are adjusted sequentially in accordance with the specific order, starting from the adjustment target determined in step S24. For example, when the adjustment target to be adjusted first after the start of the image forming process is the table data, the plurality of adjustment targets are adjusted in the order of the table data, the developing bias voltage, the amount of light emitted from the light source 39, and the position on the photoconductor drum 31 at which the electrostatic latent image is formed by the laser scanning unit 25. The process of adjusting the image quality of the output image is an example of the adjustment step in the present disclosure, and is executed by the adjustment processing portion 51B of the control portion 7.

<Step S25>

In step S25, the control portion 7 determines whether or not the image forming process has been completed.

Here, when the control portion 7 determines that the image forming process has been completed (Yes in S25), the control portion 7 shifts the processing to step S26. When the image forming process has not been completed (No in S25), the control portion 7 waits for the image forming process to be completed in step S25.

<Step S26>

In step S26, the control portion 7 records the time at the end of the image forming process. The process of step S26 is executed by the acquisition processing portion 52 of the control portion 7.

As described above, in the image forming apparatus 100B, the adjustment target to be adjusted first after the start of the image forming process is determined based on the variation amount information related to the amount of variation in the state value related to the image forming portion 3 caused by the start of the image forming process. Thus, the adjustment target to be adjusted first can be switched in accordance with how easily the state of the image forming portion 3 varies for a while from the start of the image forming process. Accordingly, the variation in the image quality of the output image immediately after the start of the image forming process can be suppressed.

When the amount of adjustment of the image quality of the output image is large, the user may perceive the change in the image quality of the output image. If the image quality of the output image changes to such an extent that the user can perceive it during the image forming process, the uniformity of the series of output images output in the image forming process is lost.

In contrast, an image forming apparatus 100C according to a third embodiment of the present disclosure can suppress the user from perceiving a change in image quality caused by the adjustment of the image quality of the output image, as will be described below.

Third Embodiment

Figure 8:
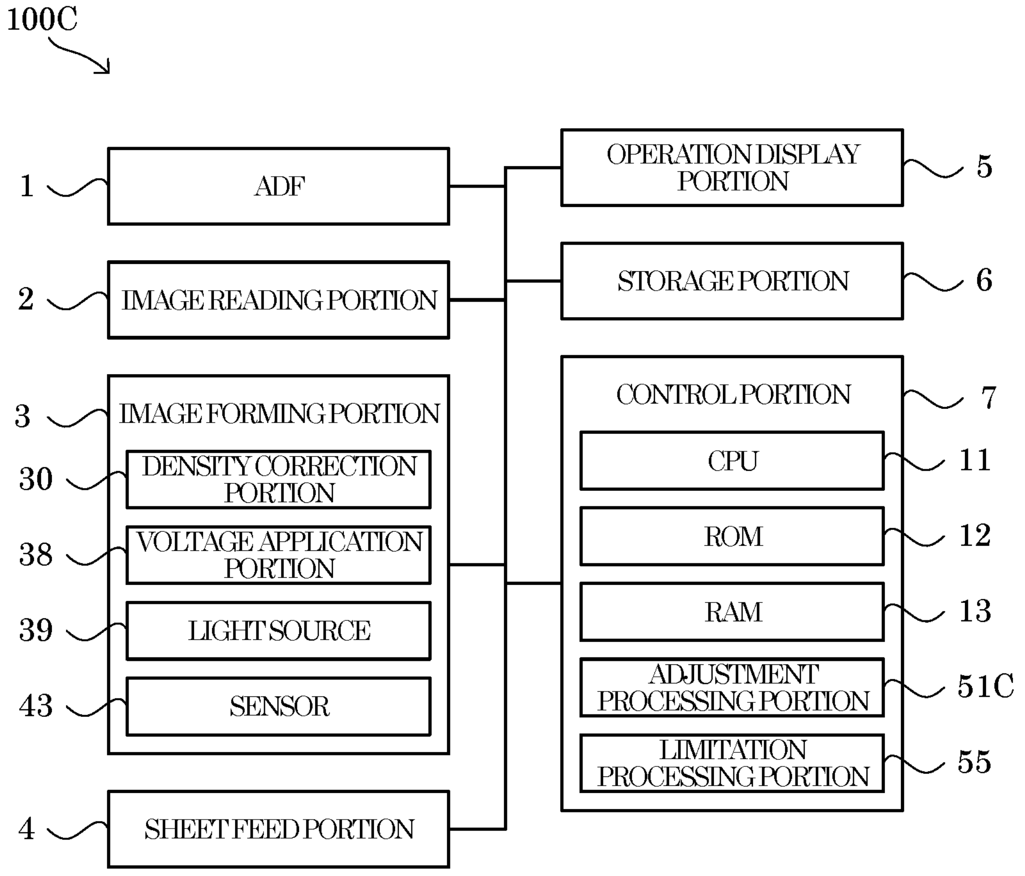
FIG. 8 is a block diagram showing a system configuration of an image forming apparatus according to a third embodiment of the present disclosure.

A configuration of the image forming apparatus 100C according to the third embodiment of the present disclosure will be described below with reference to FIG. 8.

The image forming apparatus 100C has the same configuration as the image forming apparatus 100A except for the configuration of the control portion 7. Specifically, the control portion 7 of the image forming apparatus 100C includes an adjustment processing portion 51C and a limitation processing portion 55 in place of the adjustment processing portion 51A, the acquisition processing portion 52, and the setting processing portion 53. Only the parts of the configuration of the image forming apparatus 100C that are different from that of the image forming apparatus 100A will be described below.

The adjustment processing portion 51C adjusts the image quality of the output image output by the image forming process using toner during execution of the image forming process using the image forming portion 3.

Specifically, each time a predetermined third adjustment condition (an example of the first adjustment condition of the present disclosure) is satisfied, the adjustment processing portion 51C adjusts one adjustment target selected in accordance with the specific order among the adjustment targets related to the image quality of the output image.

For example, the third adjustment condition is that the number of output images formed (the number of images formed) by the image forming process reaches a multiple of a predetermined third reference value.

For example, the third reference value is "30". In this case, in the image forming apparatus 100C, after the start of the image forming process, the developing bias voltage is adjusted when the number of output images formed (the number of images formed) reaches "30", and the amount of light emitted from the light source 39 is adjusted when the number of output images formed reaches "60". In addition, the position on the photoconductor drum 31 at which the electrostatic latent image is formed by the laser scanning unit 25 is adjusted when the number of output images formed (the number of images formed) reaches "90", the table data is adjusted when the number of output images formed reaches "120", and the developing bias voltage is adjusted again when the number of output images formed reaches "150".

It is noted that the adjustment processing portion 51C may periodically adjust only one of the developing bias voltage, the amount of light emitted from the light source 39, the position on the photoconductor drum 31 at which the electrostatic latent image is formed by the laser scanning unit 25, and the table data.

When the amount of adjustment of the image quality of the output image by the adjustment processing portion 51C exceeds a predetermined limit value, the limitation processing portion 55 limits the amount of adjustment of the image quality of the output image by the adjustment processing portion 51C to the limit value.

Specifically, when the amount of adjustment of the developing bias voltage by the adjustment processing portion 51C exceeds a predetermined first limit value, the limitation processing portion 55 limits the amount of adjustment of the developing bias voltage by the adjustment processing portion 51C to the first limit value. For example, the first limit value is 2 percent of the voltage value of the current developing bias voltage. It is noted that the first limit value may be arbitrarily set. In addition, the first limit value may be separately set for a positive amount of adjustment and a negative amount of adjustment.

In addition, when the amount of adjustment of the amount of light emitted from the light source 39 by the adjustment processing portion 51C exceeds a predetermined second limit value, the limitation processing portion 55 limits the amount of adjustment of the amount of light emitted from the light source 39 by the adjustment processing portion 51C to the second limit value. For example, the second limit value is 2 percent of the current light amount. It is noted that the second limit value may be arbitrarily set. In addition, the second limit value may be separately set for a positive amount of adjustment and a negative amount of adjustment.

In addition, when the amount of adjustment of the position on the photoconductor drum 31 at which the electrostatic latent image is formed by the adjustment processing portion 51C exceeds a predetermined third limit value, the limitation processing portion 55 limits the amount of adjustment of the position on the photoconductor drum 31 at which the electrostatic latent image is formed by the adjustment processing portion 51C to the third limit value. For example, the third limit value is 1 mm (millimeter). It is noted that the third limit value may be arbitrarily set.

In addition, when the maximum value of the amount of adjustment of the table data by the adjustment processing portion 51C exceeds a predetermined fourth limit value, the limitation processing portion 55 limits the maximum value of the amount of adjustment of the table data by the adjustment processing portion 51C to the fourth limit value. For example, the fourth limit value is 2 percent. It is noted that the fourth limit value may be arbitrarily set.

Here, when the amount of adjustment of one of the adjustment targets is limited by the limitation processing portion 55, the adjustment processing portion 51C adjusts the adjustment target whose amount of adjustment has been limited (hereinafter referred to as a "specific adjustment target") every time the third adjustment condition is satisfied until the amount of adjustment is no longer limited by the limitation processing portion 55.

Specifically, when the amount of adjustment of one of the adjustment targets is limited by the limitation processing portion 55, the adjustment processing portion 51C adjusts the specific adjustment target in place of the adjustment target following the specific adjustment target in the specific order when the third adjustment condition is satisfied the next time. Here, when the amount of adjustment of the specific adjustment target is not limited by the limitation processing portion 55, the adjustment target following the specific adjustment target in the specific order is adjusted when the third adjustment condition is satisfied the next time. On the other hand, when the amount of adjustment of the specific adjustment target is limited again by the limitation processing portion 55, the specific adjustment target is adjusted again when the third adjustment condition is satisfied the next time.

It is noted that when the amount of adjustment of one of the adjustment targets is limited by the limitation processing portion 55, the adjustment processing portion 51C may adjust the specific adjustment target every time a fourth adjustment condition (an example of the second adjustment condition of the present disclosure) that is satisfied earlier than the third adjustment condition is satisfied until the amount of adjustment is no longer limited by the limitation processing portion 55. For example, the fourth adjustment condition is that the number of output images formed (the number of images formed) by the image forming process reaches a multiple of a fourth reference value that is smaller than the third reference value. For example, the fourth reference value is "10". In this case, the adjustment target following the specific adjustment target in the specific order may be adjusted when the third adjustment condition is satisfied for the first time after the amount of adjustment of the specific adjustment target is no longer limited.

In addition, when the amount of adjustment of one of the adjustment targets is limited by the limitation processing portion 55, the adjustment processing portion 51C does not have to successively adjust the specific adjustment target. In this case, the adjustment processing portion 51C may adjust the adjustment target following the specific adjustment target in the specific order when the third adjustment condition is satisfied for the first time after the amount of adjustment of one of the adjustment targets is limited by the limitation processing portion 55.

[Third Image Quality Adjustment Process]

Figure 9:
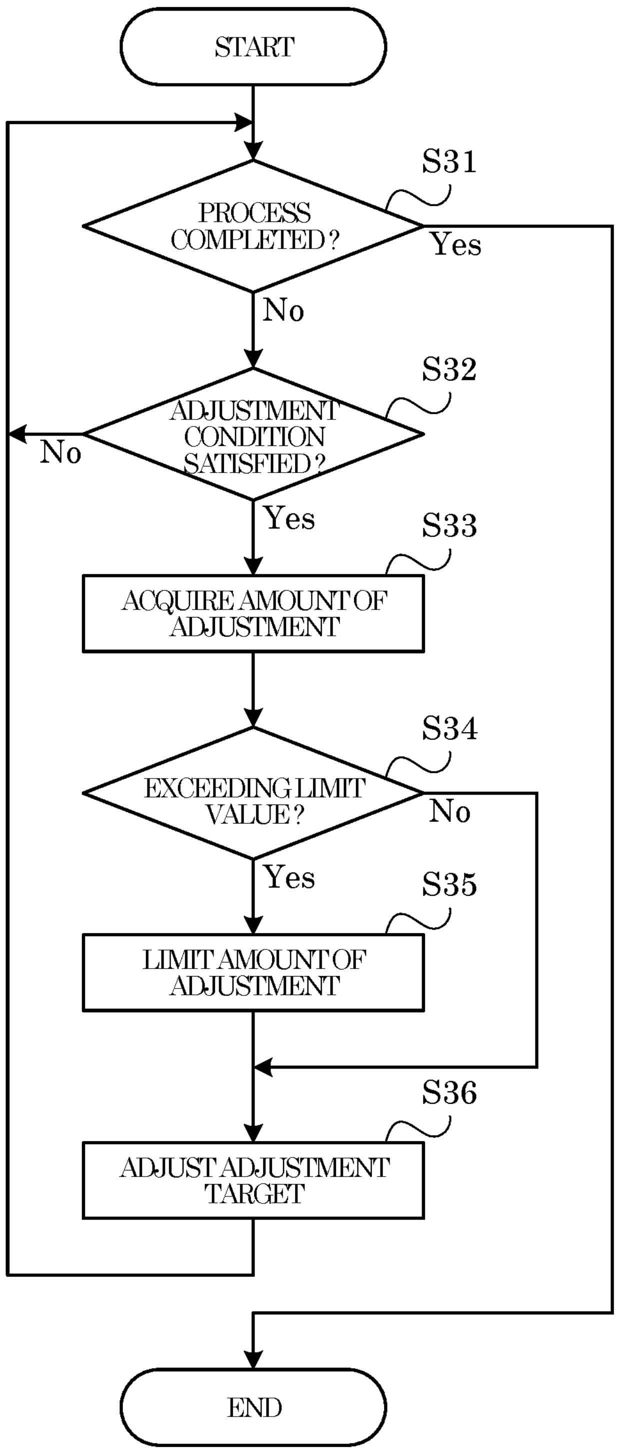
FIG. 9 is a flowchart showing an example of a third image quality adjusting process executed in the image forming apparatus according to the third embodiment of the present disclosure.

An image quality adjustment method according to the present disclosure will be described below with reference to FIG. 9, along with an example of the procedure of a third image quality adjustment process executed by the control portion 7 in the image forming apparatus 100C. It is noted that the third image quality adjusting process is executed together with the image forming process when the image forming process is executed.

<Step S31>

First, in step S31, the control portion 7 determines whether or not the image forming process has been completed.

Here, when the control portion 7 determines that the image forming process has been completed (Yes in S31), the control portion 7 terminates the third image quality adjustment process. In addition, when the image forming process has not been completed (No in S31), the control portion 7 shifts the processing to step S32.

<Step S32>

In step S32, the control portion 7 determines whether or not the third adjustment condition is satisfied.

Specifically, the control portion 7 determines that the third adjustment condition is satisfied when the number of output images formed (the number of images formed) by the image forming process reaches a multiple of the third reference value.

Here, when the control portion 7 determines that the third adjustment condition is satisfied (Yes in S32), the control portion 7 shifts the processing to step S33. In addition, when the third adjustment condition is not satisfied (No in S32), the control portion 7 shifts the processing to step S31.

<Step S33>

In step S33, the control portion 7 acquires the amount of adjustment of the image quality of the output image when one adjustment target selected in accordance with the specific order among the plurality of adjustment targets is adjusted.

Specifically, when the developing bias voltage is adjusted, the control portion 7 executes a part of the first adjustment process to acquire the first target value. Then, the control portion 7 acquires the difference between the voltage value of the current developing bias voltage and the first target value as the amount of adjustment of the developing bias voltage.

In addition, when the amount of light emitted from the light source 39 is adjusted, the control portion 7 executes a part of the second adjustment process to acquire the second target value. Then, the control portion 7 acquires the difference between the current amount of light emitted from the light source 39 and the second target value as the amount of adjustment of the amount of light emitted from the light source 39.

In addition, when the position on the photoconductor drum 31 at which the electrostatic latent image is formed by the laser scanning unit 25 is adjusted, the control portion 7 executes a part of the third adjustment process to acquire the amount of deviation of the third detection toner image in the left-right direction D3 or the belt rotation direction D5. Then, the control portion 7 acquires the acquired amount of deviation as the amount of adjustment of the position on the photoconductor drum 31 at which the electrostatic latent image is formed.

In addition, when the table data is adjusted, the control portion 7 executes a part of the fourth adjustment process to acquire the maximum value of the amount of change in the table data when the fourth adjustment process is executed. Then, the control portion 7 acquires the acquired maximum value of the amount of change as the amount of adjustment of the table data.

<Step S34>

In step S34, the control portion 7 determines whether or not the amount of adjustment of the image quality of the output image acquired in step S33 exceeds the limit value.

Specifically, when the developing bias voltage is adjusted, the control portion 7 determines whether or not the amount of adjustment of the developing bias voltage acquired in the process of step S33 exceeds the first limit value.

In addition, when the amount of light emitted from the light source 39 is adjusted, the control portion 7 determines whether or not the amount of adjustment of the amount of light emitted from the light source 39 acquired by the process of step S33 exceeds the second limit value.

In addition, when the position on the photoconductor drum 31 at which the electrostatic latent image is formed by the laser scanning unit 25 is adjusted, the control portion 7 determines whether or not the amount of adjustment of the position on the photoconductor drum 31 at which the electrostatic latent image is formed acquired by the process of step S33 exceeds the third limit value.

In addition, when the table data is adjusted, the control portion 7 determines whether or not the amount of adjustment of the table data acquired by the process of step S33 exceeds the fourth limit value.

Here, when the control portion 7 determines that the amount of adjustment of the image quality of the output image exceeds the limit value (Yes in S34), the control portion 7 shifts the processing to step S35. In addition, when the amount of adjustment of the image quality of the output image does not exceed the limit value (No in S34), the control portion 7 shifts the processing to step S36.

<Step S35>

In step S35, the control portion 7 limits the amount of adjustment of the image quality of the output image to the limit value. Here, the process of step S35 is an example of the limitation step of the present disclosure, and is executed by the limitation processing portion 55 of the control portion 7.

Specifically, when the developing bias voltage is adjusted, the control portion 7 limits the amount of adjustment of the developing bias voltage by the first adjustment process to the first limit value.

In addition, when the amount of light emitted from the light source 39 is adjusted, the control portion 7 limits the amount of adjustment of the amount of light emitted from the light source 39 by the second adjustment process to the second limit value.

In addition, when the position on the photoconductor drum 31 at which the electrostatic latent image is formed by the laser scanning unit 25 is adjusted, the control portion 7 limits the amount of adjustment of the position on the photoconductor drum 31 at which the electrostatic latent image is formed by the third adjustment process to the third limit value.

In addition, when the table data is adjusted, the control portion 7 limits the amount of adjustment of the table data by the fourth adjustment process to the fourth limit value.

<Step S36>

In step S36, the control portion 7 adjusts one adjustment target selected in accordance with the specific order among the plurality of adjustment targets. Here, the processing of step S33 and step S36 is an example of the adjustment step of the present disclosure, and is executed by the adjustment processing portion 51C of the control portion 7.

Specifically, when the developing bias voltage is adjusted, the control portion 7 executes the part of the first adjustment process that is not executed in step S33.

In addition, when the amount of light emitted from the light source 39 is adjusted, the control portion 7 executes the part of the second adjustment process that is not executed in step S33.

In addition, when the position on the photoconductor drum 31 at which the electrostatic latent image is formed by the laser scanning unit 25 is adjusted, the control portion 7 executes the part of the third adjustment process that is not executed in step S33.

In addition, when the table data is adjusted, the control portion 7 executes the part of the fourth adjustment process that is not executed in step S33.

Here, when the process of step S35 is executed, the amount of adjustment of the image quality of the output image by the process of step S36 is limited to the limit value. In addition, when the process of step S35 is executed, the specific adjustment target is adjusted again when the third adjustment condition is satisfied the next time.

As described above, in the image forming apparatus 100C, when the amount of adjustment of the image quality of the output image exceeds the limit value, the amount of adjustment of the image quality of the output image by the adjustment processing portion 51C is limited to the limit value. This suppresses the user from perceiving changes in the image quality caused by the adjustment of the image quality of the output image.

In addition, in the image forming apparatus 100C, when the amount of adjustment of the image quality of the output image is limited, the specific adjustment target is successively adjusted until the amount of adjustment of the specific adjustment target is no longer limited. This allows the parameters related to the image quality of the output image to be corrected to the target values earlier.

APPENDIXES TO DISCLOSURE

The following are appendixes to the overview of the disclosure extracted from the above embodiments. It is noted that the structures and processing functions to be described in the following appendixes can be selected and combined arbitrarily.

Appendix 1

An image forming apparatus comprising: an image forming portion configured to form an image using toner; an adjustment processing portion configured to, each time a predetermined adjustment condition is satisfied during execution of an image forming process using the image forming portion, use the toner to adjust one adjustment target selected in accordance with a predetermined specific order among a plurality of adjustment targets related to image quality of an output image output by the image forming process; an acquisition processing portion configured to acquire variation amount information related to an amount of variation in a predetermined state value related to the image forming portion caused by a start of the image forming process; and a determination processing portion configured to determine an adjustment target to be adjusted first after the start of the image forming process by the adjustment processing portion, based on the variation amount information acquired by the acquisition processing portion.

Appendix 2

The image forming apparatus according to Appendix 1, wherein the state value includes one or both of an amount of charge of the toner and a temperature of the image forming portion, and the variation amount information includes an elapsed time from an end of an immediately preceding image forming process.

Appendix 3

The image forming apparatus according to Appendix 1 or Appendix 2, wherein the state value includes an amount of charge of the toner, and the variation amount information includes a difference between an amount of the toner consumed during formation of a last output image in an immediately preceding image forming process and an amount of the toner consumed during formation of a first output image in a next image forming process.

Appendix 4

The image forming apparatus according to any one of Appendixes 1 to 3, wherein the state value includes a temperature of the image forming portion, and the variation amount information includes a difference between a temperature of the image forming portion at an end of an immediately preceding image forming process and a temperature of the image forming portion at a start of a next image forming process.

Appendix 5

The image forming apparatus according to any one of Appendixes 1 to 4, wherein the image forming portion includes: a density correction portion configured to correct a density of image data based on predetermined table data; a light source configured to emit light based on the image data after density correction by the density correction portion; a laser scanning portion configured to run the light emitted from the light source to form an electrostatic latent image on an image carrier; and a developing portion configured to develop the electrostatic latent image formed by the laser scanning portion in accordance with application of a predetermined developing bias voltage, wherein the plurality of adjustment targets include the developing bias voltage, an amount of the light, a position on the image carrier at which the electrostatic latent image is formed by the laser scanning portion, and the table data.

Appendix 6

An image quality adjustment method executed in an image forming apparatus including an image forming portion configured to form an image using toner, the image quality adjustment method comprising: an adjustment step of, each time a predetermined adjustment condition is satisfied during execution of an image forming process using the image forming portion, using the toner to adjust one adjustment target selected in accordance with a predetermined specific order among a plurality of adjustment targets related to image quality of an output image output by the image forming process; an acquisition step of acquiring variation amount information related to an amount of variation in a predetermined state value related to the image forming portion caused by a start of the image forming process; and a determination step of determining an adjustment target to be adjusted first after the start of the image forming process by the adjustment step, based on the variation amount information acquired by the acquisition step.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:

an image forming portion configured to form an image using toner;

an adjustment processing portion configured to, each time a predetermined adjustment condition is satisfied during execution of an image forming process using the image forming portion, use the toner to adjust one adjustment target selected in accordance with a predetermined specific order among a plurality of adjustment targets related to image quality of an output image output by the image forming process;

an acquisition processing portion configured to acquire variation amount information related to an amount of variation in a predetermined state value related to the image forming portion caused by a start of the image forming process; and a determination processing portion configured to determine an adjustment target to be adjusted first after the start of the image forming process by the adjustment processing portion, based on the variation amount information acquired by the acquisition processing portion.

2. The image forming apparatus according to claim 1, wherein the state value includes one or both of an amount of charge of the toner and a temperature of the image forming portion, and the variation amount information includes an elapsed time from an end of an immediately preceding image forming process.

3. The image forming apparatus according to claim 1, wherein the state value includes an amount of charge of the toner, and the variation amount information includes a difference between an amount of the toner consumed during formation of a last output image in an immediately preceding image forming process and an amount of the toner consumed during formation of a first output image in a next image forming process.

4. The image forming apparatus according to claim 1, wherein the state value includes a temperature of the image forming portion, and the variation amount information includes a difference between a temperature of the image forming portion at an end of an immediately preceding image forming process and a temperature of the image forming portion at a start of a next image forming process.

5. The image forming apparatus according to claim 1, wherein the image forming portion includes:

a density correction portion configured to correct a density of image data based on predetermined table data;

a light source configured to emit light based on the image data after density correction by the density correction portion;

a laser scanning portion configured to run the light emitted from the light source to form an electrostatic latent image on an image carrier; and a developing portion configured to develop the electrostatic latent image formed by the laser scanning portion in accordance with application of a predetermined developing bias voltage, wherein the plurality of adjustment targets include the developing bias voltage, an amount of the light, a position on the image carrier at which the electrostatic latent image is formed by the laser scanning portion, and the table data.

6. An image quality adjustment method executed in an image forming apparatus including an image forming portion configured to form an image using toner, the image quality adjustment method comprising:

an adjustment step of, each time a predetermined adjustment condition is satisfied during execution of an image forming process using the image forming portion, using the toner to adjust one adjustment target selected in accordance with a predetermined specific order among a plurality of adjustment targets related to image quality of an output image output by the image forming process;

an acquisition step of acquiring variation amount information related to an amount of variation in a predetermined state value related to the image forming portion caused by a start of the image forming process; and a determination step of determining an adjustment target to be adjusted first after the start of the image forming process by the adjustment step, based on the variation amount information acquired by the acquisition step.

* * * * *